Sept. 8, 1959   N. P. MILLAR ET AL   2,903,647
ADJUSTABLE ELECTRICAL MEASURING AND INDICATING INSTRUMENT
Filed Dec. 31, 1956                                    2 Sheets-Sheet 1

Inventors:
Norval P. Millar
Earl W. Clark
by Richard E. Horley
Their Attorney

Sept. 8, 1959  N. P. MILLAR ET AL  2,903,647
ADJUSTABLE ELECTRICAL MEASURING AND INDICATING INSTRUMENT
Filed Dec. 31, 1956  2 Sheets-Sheet 2

Inventors:
Norval P. Millar
Earl W. Clark
by Richard E. Hosley
Their Attorney

United States Patent Office 2,903,647
Patented Sept. 8, 1959

2,903,647

ADJUSTABLE ELECTRICAL MEASURING AND INDICATING INSTRUMENT

Norval P. Millar, Danvers, and Earl W. Clark, East Lynn, Mass., assignors to General Electric Company, a corporation of New York Application December 31, 1956, Serial No. 631,628

8 Claims. (Cl. 324—151)

This application is a continuation-in-part of the pending application of Millar et al., entitled "Adjustable Electrical Measuring and Indicating Instruments," Serial No. 452,682, filed August 27, 1954, assigned to the same assignee to which the present invention is assigned and the invention described herein relates to measuring and indicating instruments and is concerned in particular with arrangements for allowing adjustments of the magnetic circuits of such instruments to vary the scale distribution characteristics thereof.

It is well known that in the manufacture of such instruments, the characteristics of the various components will vary slightly from one instrument to the next within certain unavoidable tolerance limits. And it is, of course, desirable from the cost standpoint to avoid the necessity for matching the scales of such instruments to each individual instrument to take into account these slight variations. Such a practice is also to be avoided from the standpoint of replacement parts since once the instrument is in service, it is a very desirable feature from the customer's viewpoint to be able to purchase standard replacement parts which are interchangeable among all instruments of the same design.

Consequently, it has always been an objective of the industry to provide, insofar as the development of the art would allow, standard components which can be mass produced to minimize cost and which can be interchanged among different instruments of the same design.

One of the most difficult areas in this respect involves the problems of providing an instrument capable of utilizing a standard printed scale interchangeable among all instruments of the same type since, unless special and more costly manufacturing techniques or steps are employed in the manufacturing process, the scale distribution characteristics will vary from one instrument to the next by reason of the normal manufacturing variations in dimensions, material, assembly, etc.

The advantages to be derived from providing a standard interchangeable scale are so substantial that it has in certain cases been the practice to employ special manufacturing techniques to match the instrument characteristics to a standard printed scale. In other cases, various types of adjusting arrangements are provided, which can be set in the factory after the instrument has been assembled to adjust the characteristics of the instrument to conform with the scale markings.

In view of the foregoing, it is accordingly one object of this invention to provide an improved low cost arrangement for permitting the deflection characteristics of a measuring and indicating instrument to be adjusted so as to allow calibration with a standard printed scale.

It is another object of this invention to provide an improved adjusting arrangement which allows for facile and inexpensive adjustment of the scale distribution characteristics thereof.

Briefly stated, this invention, in accordance with one embodiment thereof, provides adjustable magnetic members, which members form part of the magnetic circuit of the instrument and which define a portion of the air gap in which a deflectable coil is mounted, together with means for allowing rapid and simple adjustment of the aforesaid magnetic members to vary the scale distribution characteristics of the instrument to conform with a standard printed scale. The invention allows measuring and indicating instruments to be manufactured on a quantity basis with interchangeable printed scales.

The objects and advantages of this invention will be readily understood upon reference to the following description, particularly when taken in conjunction with the drawings annexed hereto, in which.

Figure 1:
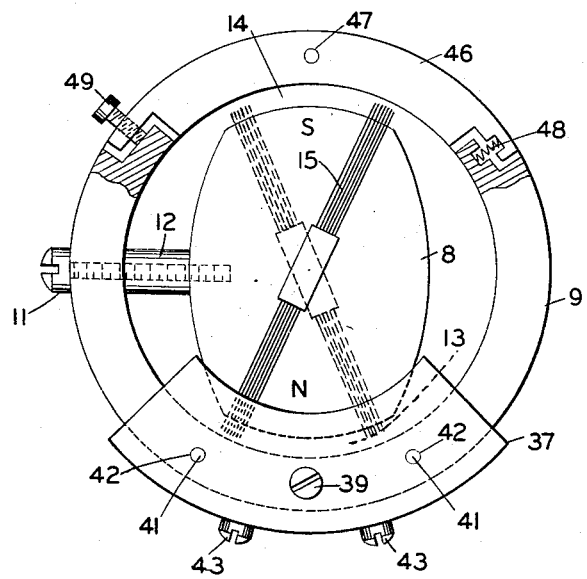
Figure 1 is a plan view of a portion of an instrument mechanism constructed in accordance with this invention.

The instrument mechanism shown in the drawings is generally referred to as a moving coil—internal magnet type, and comprises a permanent magnet 8, having north and south poles as indicated, mounted within an annular ring 9 of magnetic material in any suitable manner such as by means of a screw 11 and is positioned within the ring by means of a spacer bushing 12. The permanent magnet 8 is mounted within the annular ring 9 so as to form air gaps 13 and 14 between the ring and the permanent magnet adjacent the north and south poles thereof.

Thus, the permanent magnet 8 sets up a magnetic field which, to choose a starting point at the north pole of the magnet, extends across the air gap 13 to the annular ring 9 around the annular ring and back across the air gap 14 to the south pole of the magnet. An elongated substantially rectangularly shaped coil 15 is supported on a pair of spindles 16 and 17 which are in turn pivotally supported in any well known manner such as in a pair of jewel bearings 18 and 19 suitably mounted in the instrument casing or in the structural assembly of the internal mechanism. The coil has affixed thereto a suitable pointer 21, intended to cooperate with a preprinted instrument dial in the known manner.

Figure 2:
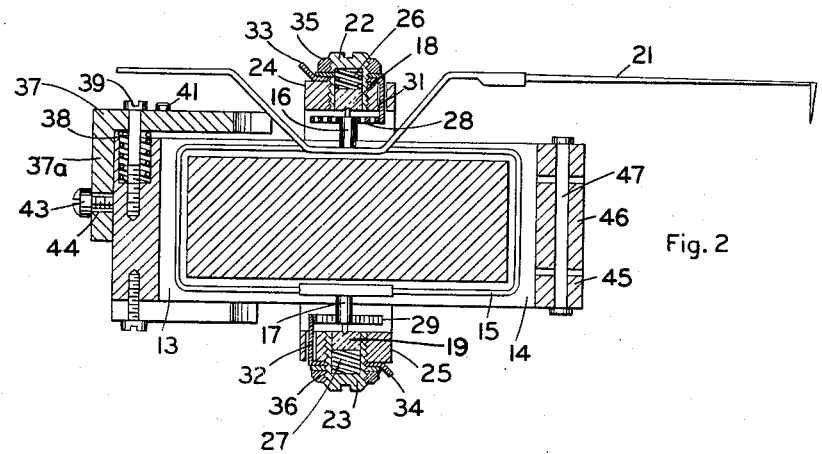
Figure 2 is a sectional view of the mechanism shown in Figure 1, with the instrument pointer and mounting arrangements for the moving coil added thereto.

Such a mounting arrangement is shown in Figure 2 and comprises adjustable bearing cups 22 and 23 which are threaded into structural supporting members 24 and 25. Shock absorbing springs 26 and 27 are provided in the cups 22 and 23 to resiliently support the bearings. Control springs 28 and 29 are provided for resiliently opposing deflection of the coil assembly and are connected at their inner ends to the spindles 16 and 17 which are in turn electrically connected to opposite ends of the coil 15. The outer ends of the control springs are connected to tab portions 31 and 32 which extend in from washers 33 and 34 through arcuately shaped slots in the supporting members 24 and 25.

The washers 33 and 34 can be rotated a limited amount to adjust the force exerted by the control springs 28 and 29 in order to properly zero the instrument. The washers 33 and 34 also serve as terminals for the coil 15 since they are connected to the ends of the coil through the control springs 28 and 29 as has been described and suitable electrical leads may be connected to the washers to allow energization of the coil. The bearing assemblies are locked in place by means of nuts 35 and 36, which are externally threaded onto the bearing cups 22 and 23 as shown.

The end portions of the coil 15 extend through the air gaps 13 and 14 and with an electrical current flowing in the coil a torque will be developed tending to cause deflection by reason of the interaction of the electromagnetic field produced by the coil and the field produced by the permanent magnet 5. In the particular arrangement described herein, the zero deflection point of the coil has been chosen with the coil in the position shown in Figure 1 and the full scale deflection point is identified by the position shown in the dotted lines in Figure 1. The pointer 21 is connected to the coil 15 in any suitable manner such as is shown in Figure 2 so as to be deflectable with the coil and thereby indicating a reading on the printed scale plate associated therewith. The pointer 21 is not shown in the remaining figures in order to allow other features of the instrument to be illustrated with greater clarity.

Arrangements of the general type just described are quite conventional and are quite commonly employed in one form or another in instruments of this general type.

In the quantity manufacture of instruments falling within this general category, that is instruments which utilize the general principle of a coil deflectably mounted in a magnetic field, it has been extremely difficult to control the dimensions, materials, and assembly operations with sufficient exactness and uniformity from one instrument to the next to allow the use of standard printed scales which will be interchangeable among all instruments of the same design. The problems arising in this connection and some of the prior art practices have already been described above. This invention accordingly provides adjustable magnetic circuitry for such instruments which allows for minor adjustments to be made to compensate for the above-mentioned variations in characteristics from one instrument to the next, thereby allowing standard printed scales to be employed.

In the aforesaid pending application of Millar et al., there is described and claimed adjustable magnetic circuitry for controlling full scale deflection characteristics of a moving coil—internal magnet instrument. One form of such adjustable magnetic circuitry is also shown herein to demonstrate how the novel arrangements for adjusting the scale distribution characteristics—described and claimed herein—co-act therewith, and the form shown comprises a member 37, formed of a magnetic material, and adjustably mounted on ring 9. Portions of member 37 extend out over the side portion of coil 15, as shown in Figure 2, thereby forming a part of the magnetic circuit and defining a portion of the air gap in which the coil deflects. It will be seen that with the provision of plate 37, the total magnetic reluctance of the circuit will be decreased and that the side portions of the coil adjacent the plate will contribute a greater amount of torque tending to cause deflection, since the flux density along the sides of the coil is increased by the proximity of the plate to the permanent magnet 8.

The plate 37 extends over an arc of greater than 45°, which is the full deflection sweep of the coil 15 in the instrument illustrated, and the amount by which the plates radially overlap the adjacent coil portions is constant regardless of the amount of deflection as can be seen by referring to Figure 1. In other words, both the width and the length of the air gap formed between the plate 37 and the magnet 8 are constant across the deflection sweep of the coil so that the scale distribution is not greatly affected by the provision of these plates.

Plate 37 is spring loaded away from the magnet 8 by means of a spring 38 and can be adjusted either toward or away from the magnet by means of screw 39. The plate is provided with a pair of guide pins 41 which are affixed to the ring 9 and which slide in corresponding holes 42 in the plate as they are adjusted and serve to maintain the plates in a position where the amount of overlap with the adjacent side of the coil 15 is constant across the deflection of the coil with adjustment of the plate. The plate is further guided by a cylindrically shaped extension 37a which is shaped to mate with the outer cylindrical surface of the ring 9. The plate 37 may be locked in place by means of locking screws 43 which extend through elongated slots 44 in the plate, and into corresponding tapped holes in the ring 9. Thus, when the plate is adjusted to the desired spaced relationship to the magnet 8, the screws 43 can be tightened down to secure the plates in that position.

It will be seen that with the arrangement just described, a portion of the air gap in which the coil is mounted becomes adjustable uniformly across the full sweep of the coil. Thus, the flux distribution across the sweep of the coil is not greatly changed by adjustment of the plate 37 although the flux density in the air gap between the plate and the magnet 8 is directly affected by the resulting changes in the length of the air gap. The net result is that the flux density in the vicinity of the portions of the coil 15 which are adjacent the plate 37 can be increased or decreased simultaneously across the full sweep of such coil portions, thereby increasing or decreasing the total torque developed by the coil 15 for a given current flowing therein, by substantially the same percentage across the full scale sweep of the coil.

It will be seen therefore that this arrangement allows adjustment of the full scale current of the instrument without substantially disturbing the scale distribution characteristics thereof. The term "full scale current," as commonly defined, and as used herein, refers to the current in the instrument coil at which full scale deflection of the coil and its associated indicating means occurs.

The novel arrangements for adjusting the scale distribution characteristics of the instrument will now be described, and in this connection the ring 9 has a portion thereof cut away at 45 in which is mounted an adjustable member 46 of magnetic material. The adjustable member 46 is pivotally mounted on a pin 47 which extends into the ring 9 as shown.

The member 46 can be pivotally adjusted on the pin 47 against the force of a spring 48 by means of a screw 49. It will be seen that this construction allows adjustment of the air gap 14 across the sweep of the instrument coil, the limits of which sweep are shown by the two positions of coil 15 shown in Figure 1.

It will be seen by referring to Figure 1 that when the left hand portion of the member 46 is moved away from the magnet 8 by adjustment of screw 49, the right hand portion thereof is thereby moved inwardly toward the magnet 8. Such an adjustment will decrease the flux density along the left hand portion of the air gap 14 and increase the flux density along the right hand portion thereof and thereby change the scale distribution characteristics of the instrument. It will be apparent that the member 46 may also be adjusted in the opposite direction to obtain an effect opposite to that just described.

Thus, the scale distribution of the instrument may be varied by adjustment of the member 46 to obtain the proper characteristics, after which adjustment the plate 37 may then be adjusted as previously described to obtain the desired full scale current without substantially disturbing the scale distribution characteristics.

Figure 4:
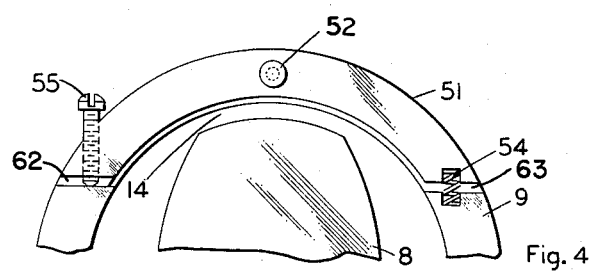
Figure 4 is a partial plan view, similar to the view shown in Figure 1, of a modified form of the invention.
Figure 5:
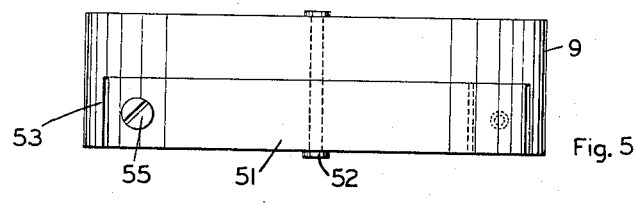
Figure 5 is a rear elevation view, similar to the view shown in Figure 3, of the arrangement shown in Figure 4.

A modified form of the invention is shown in Figures 4 and 5, where like parts have like numbers, comprising the permanent magnet 8, ring 9, and adjustable member 51 of magnetic material. Like member 46, member 51 is pivotally mounted in ring 9 by means of a pin 52, being positioned within a cut-away portion 53 extending along one edge of ring 9. Member 51 is spring-biased at one end by coil spring 54 and is adjustable in position relative to the ring and magnet by means of adjusting screw 55.

The inside radius of member 51 is slightly larger than the inside radius of ring 9 so that the adjustable air gap between member 51 and magnet 8 is not smaller than the primary fixed gap 14, for any set position of member 51 in the normal adjustment range required for the instrument. However, positive stops are desirable to insure that the air gap between the member 51 and the magnet 8 is never smaller than fixed gap 14 and may be provided by dimensioning the spaces or gaps 62 and 63 between the ends of member 51 and ring 9 so as to prevent more than the desired range of movement of member 51. Alternatively, of course, stops could be associated with the adjusting screw 55.

Figure 6:
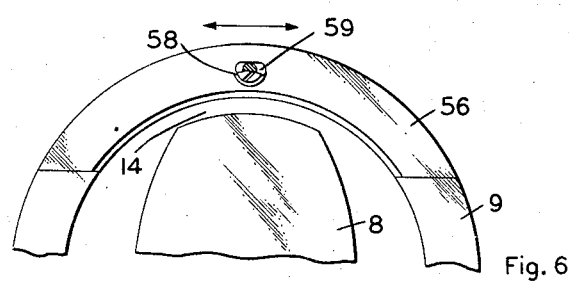
Figure 6 is a partial plan view, similar to the view shown in Figure 4, of another modification of the invention; and, Figure 7 is a rear elevation view, similar to the view shown in Figure 5, of the arrangement shown in Figure 6.
Figure 7:
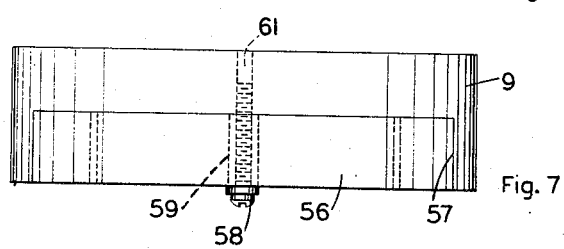

Another form of the invention is shown in Figures 6 and 7, where like parts have like numbers, being similar in all respects to the arrangement shown in Figures 4 and 5, except that the adjustable member 56 is slidably mounted on ring 9, being positioned within a cut-away portion 57 extending around one edge of ring 9. Member 56 is held on the ring 9 by means of a clamping screw 58 which passes through an elongated slot 59 formed in member 56 and extends into a tapped hole 61 provided in ring 9. When the screw is loosened, member 56 may be moved to the right or left, as shown by the arrows, in the general direction of the path of moving coil 15. Like member 51, the inside radius of member 56 is slightly larger than the inside radius of ring 9, so that in no position of member 56 in the normal adjustment range of the instrument is the adjustable air gap between it and magnet 8 any smaller than primary fixed gap 14. Positive stops are provided to insure that the adjustable air gap between member 56 and magnet 8 never is less than primary fixed gap 14 by dimensioning elongated slot 59 and the associated diameter of clamping screw 58 so as to restrict the movement of member 56 to the desired limits.

Figure 3:
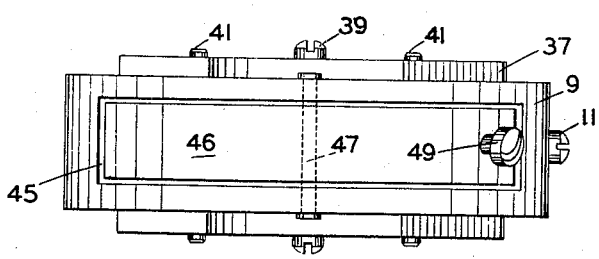
Figure 3 is a rear elevation view of the arrangement shown in Figure 1.

From the above, it is thus apparent that the modifications shown in Figures 4 to 7 function similarly to the arrangement shown in Figures 1 to 3, all forms of the invention yielding a controllable scale distribution characteristic which can be matched to a pre-printed instrument scale.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. A measuring and indicating instrument comprising a permanent magnet, an annular ring of magnetic material extending around said magnet in spaced relationship thereto, a coil concentrically mounted with respect to said ring for pivotal deflection in the air gap between said ring and said magnet, a transverse slot extending around a portion of said ring adjacent the sweep of a portion of said coil, an arcuately shaped member of magnetic material pivotally mounted in said slot about a pivot member positioned stationary relative to said ring, said arcuately shaped member forming an air gap with said permanent magnet along the sweep of said coil portion, and means for pivotally adjusting said member to vary said air gap by different amounts along the sweep of said coil portion and thereby change the scale distribution characteristics of said instrument.

2. A measuring and indicating instrument comprising, in combination: a permanent magnet, an annular ring of magnetic material encircling said magnet in spaced relation thereto to define therewith a first fixed air gap, a coil concentrically mounted with respect to said ring for pivotal deflection in said fixed air gap, said ring having a portion thereof cut away, said cut-away portion extending around a portion of said ring adjacent substantially the entire sweep of a portion of said coil, an arcuately shaped member of magnetic material movably mounted in said cut-away portion and forming an adjustable air gap with said permanent magnet along the said sweep of said coil, and means for moving said member to vary said adjustable air gap by different amounts along substantially the entire sweep of said coil portion to thereby change the scale distribution characteristics of said instrument.

3. A measuring and indicating instrument comprising, in combination: a permanent magnet core member having a pair of arcuate shaped poles of opposite polarity, an annular ring of magnetic material encircling said core in spaced relation thereto to define with said arcuate shaped poles a pair of fixed air gaps, a coil encircling said core and concentrically mounted with respect to said ring for pivotal deflection in said gaps, said ring having a portion thereof cut away, said cut-away portion extending around a portion of said ring adjacent substantially the entire sweep of a portion of said coil in one of said fixed air gaps, an arcuately shaped member of magnetic material movably mounted in said cut-away portion and forming an adjustable air gap with one of said arcuate poles along the sweep of said coil, and means for moving said member to vary said adjustable air gap by different amounts along substantially all of the sweep of said coil portion to thereby change the scale distribution characteristics of said instrument.

4. The combination defined by claim 3 wherein said arcuate shaped member has an inside radius larger than the inside radius of said annular ring and the said arcuate shaped member and the mounting thereof relative to said cut-away portion are constructed such that said adjustable air gap is never smaller than said fixed air gap for any position of said arcuate shaped member.

5. The combination defined by claim 4 wherein said arcuate shaped member is pivotally mounted in said ring about a pivot member positioned stationary relative to said ring and intermediate the ends of said cut-away portion.

6. The combination defined by claim 5 wherein spring means is affixed between one end of said arcuate shaped member and said ring, the other end of said arcuate shaped member having an adjustably mounted screw therein, said spring functioning to urge said screw against said ring.

7. The combination defined by claim 4 wherein said arcuate shaped member is slidably mounted on said ring, said mounting including a portion positioned stationary with respect to the annular ring and cooperating with a portion of said arcuately shaped magnetic member.

8. The combination defined by claim 7 wherein said portion of said arcuate shaped member is an elongated slot extending therethrough, said slot being elongated in the general direction of the sweep of said coil, said stationary portion of said mounting comprises a clamping screw mounted on said ring, and said screw passes through said slot and engages said arcuate shaped member to clamp it in place upon adjustment of the position thereof.

References Cited in the file of this patent
UNITED STATES PATENTS

| | | |
|---|---|---|
| 627,908 | Davis et al. | June 27, 1899 |
| 1,952,160 | Faus | Mar. 27, 1937 |
| 2,537,221 | Hickok | Jan. 9, 1951 |
| 2,639,307 | Bakke | May 19, 1953 |
| 2,773,240 | Young | Dec. 4, 1956 |

FOREIGN PATENTS

| | | |
|---|---|---|
| 891,979 | France | Mar. 24, 1944 |